United States Patent
McKenzie et al.

(10) Patent No.: US 6,923,198 B2
(45) Date of Patent: Aug. 2, 2005

(54) FULLY DRAINABLE WEIR VALVE

(75) Inventors: Jeffrey J. McKenzie, Watertown, MN (US); Michael W. Johnson, St. Louis Park, MN (US)

(73) Assignee: Entegris, Inc., Chaska, MN (US)

( * ) Notice: Subject to any disclaimer, the term of this patent is extended or adjusted under 35 U.S.C. 154(b) by 190 days.

(21) Appl. No.: 10/390,350

(22) Filed: Mar. 17, 2003

(65) Prior Publication Data

US 2004/0069343 A1 Apr. 15, 2004

Related U.S. Application Data

(60) Provisional application No. 60/365,492, filed on Mar. 18, 2002.

(51) Int. Cl.[7] .................................................. F16K 7/12
(52) U.S. Cl. ............................ 137/15.18; 137/315.07; 251/331
(58) Field of Search ....................... 137/15.17, 15.18, 137/315.07, 238; 251/291, 331

(56) References Cited

U.S. PATENT DOCUMENTS

| | | | | |
|---|---|---|---|---|
| 3,812,398 A | * | 5/1974 | Kozel et al. ................. | 251/331 |
| 4,538,638 A | | 9/1985 | Stack | |
| 4,917,357 A | * | 4/1990 | Danko .......................... | 251/331 |
| 4,968,003 A | * | 11/1990 | Danko .......................... | 251/285 |
| 4,977,929 A | | 12/1990 | Chinnock et al. | |
| 5,065,980 A | * | 11/1991 | Pedersen ...................... | 251/331 |
| 5,160,117 A | * | 11/1992 | Besombes ..................... | 251/331 |
| 5,222,523 A | | 6/1993 | Trimble | |
| 5,227,401 A | | 7/1993 | Hanson et al. | |
| 5,277,401 A | * | 1/1994 | Butler et al. ................. | 251/331 |
| 5,297,328 A | | 3/1994 | Reimers et al. | |
| 5,327,937 A | | 7/1994 | Kato et al. | |
| 5,439,197 A | * | 8/1995 | Itoi et al. ..................... | 251/331 |
| 5,971,025 A | | 10/1999 | Backlund | |
| 6,289,933 B1 | | 9/2001 | Fischer | |

* cited by examiner

*Primary Examiner*—Kevin Lee
(74) *Attorney, Agent, or Firm*—Patterson, Thuente, Skaar & Christenson, P.A.

(57) ABSTRACT

A fully draining valve including an upper valve portion and a lower valve portion. The lower valve body has an integral weir, which in conjunction with a resilient diaphragm, defines a fluid passage. The weir axis is sloped from a horizontal plane. A first duct axis is sloped downwardly away from the weir and sloped from the horizontal plane. A second duct axis is sloped downwardly away from the weir and sloped from the horizontal plane. A third duct axis is oriented downwardly away from the weir and substantially parallel to a vertical axis such that substantially all liquid from within the fluid passage drains from the valve by gravity.

23 Claims, 8 Drawing Sheets

FULLY DRAINABLE WEIR VALVE

CLAIM TO PRIORITY

This application claims priority to U.S. Provisional Patent Application ser. No. 60/365,492 filed on Mar. 18, 2002 entitled FULLY DRAINABLE WEIR VALVE which is incorporated by reference herein.

FIELD OF THE INVENTION

The present invention relates to valves, and more particularly, to plastic diaphragm valves having a weir-type seating surface.

BACKGROUND OF THE INVENTION

Diaphragm valves provide excellent sealing and isolation characteristics to contain fluid being controlled and prevent migration of the controlled fluid. into the valve mechanisms or out of the valve. Diaphragm valves utilize a resilient diaphragm and a valve shoulder to engage a valve seat and prevent the flow of fluid past the valve seat. A weir-type diaphragm valve is a valve utilizing a resilient diaphragm that engages a weir to control flow of fluid over the weir. The diaphragm may be controllably lifted and sealed against the weir to selectively permit flow though the valve.

Weir-type diaphragm valves are often employed in the biotechnological, pharmaceutical, chemical, food processing, beverage, cosmetic, and semiconductor industries. These industries require valves that protect against product contamination and leakage within the valve, workplace and atmosphere. Weir-type diaphragm valves are well suited to meet these requirements because the mechanical valve parts are isolated from fluid flowing through the valve.

Weir-type diaphragm valves are commonly used to control the flow through a branch in a fluid distribution system or to deliver a sample of a fluid from a process. Each of U.S. Pat. No's 5,065,980, 5,227,401, 5,222,523, 5,327,937 and 6,289,933 disclose diaphragm valves suitable for branch control and sampling. Often, it is desirable to mount such valves in a horizontal position, wherein the weir extends in a horizontal direction.

These prior art valve design do not allow for complete draining of the fluid passageways due to surfaces that are not configured for drainage. U.S. Pat. No. 6,289,933, for example, has a plurality of horizontal surfaces that may retain fluids. Such stagnant or retained fluids may be a source for contamination in a process. For fluids used in industrial processes, such as the pharmaceutical, sanitary, and semiconductor industries, the process fluids generally must be kept ultra pure. Contamination of these processes may represent significant monetary losses. Therefore, separate cleaning steps must be employed to cleanse any stagnant or trapped fluids from the prior art valve designs. This extra step increases processing time and cost.

Traditionally, diaphragm valves were made of metal alloys. Such metal valves provide good durability and service life in basic fluid control applications. However, metal alloys are not well suited to some process environments, such as pharmaceutical and semiconductor manufacturing. In those applications, the fluids often used are highly corrosive or caustic and also must be kept ultra pure. These corrosive fluids can erode the metal from the valve body and contaminate the ultra pure process fluids. Also, some metal alloys may act as catalysts causing the process fluids to undergo chemical reactions, thereby compromising end products, and potentially, worker safety.

Specialized high strength alloys and stainless steels have been developed to minimize reactivity and erosion in the valve bodies. However, such specialized alloys are very difficult to cast or machine into valve components. The resulting valves are very costly to purchase relative to traditional metal valves. Moreover, stainless steel is not suitable in particular applications such as the semiconductor processing industry.

Plastic lined metal valves were developed to allow traditional metal valve bodies to handle caustic fluids in specialized process applications. The metal valve body is first formed by casting or machining. Then, a plastic or fluoropolymer is molded in the interior of the valve body where process fluids contact the body. U.S. Pat. No. 4,538,638 discloses a plastic lined metal bodied diaphragm valve.

Although, the plastic lined metal valves and plastic lined plastic valves may provide the desired resistance to degradation by-process fluids, manufacturing costs are high. High costs are attributable to the complicated multi-step manufacturing process of molding a plastic lining in a support body. The plastic lining may be subject to creep with respect to its surface underneath. Creep reduces the useful life of the expensive plastic lined valve.

Through advances in plastics and manufacturing technologies, valves made entirely or almost entirely of fluoropolymers have become commercially viable. Such plastic valves are capable of providing a cost effective valve having desirable non-reactive and corrosive resistant properties ideally suited for use in pharmaceutical and semiconductor manufacturing applications. U.S. Pat. Nos. 5,279,328 and 4,977,929 disclose plastic diaphragm valves. In certain applications, plastic bodied valves may also be provided with a plastic lining. U.S. Pat. No. 4,538,638 discloses a plastic lined diaphragm valve. These three patents are incorporated by reference herein.

While fluoropolymer valves and plastic valves having fluoropolymer liners are well suited to withstanding caustic fluids, they are susceptible to dimensional degradation such as warpage and creep. Fluids used in industrial processes, such as the pharmaceutical, sanitary, and semiconductor industries, generally require the process fluids to be kept ultra pure. Components used in fluid delivery systems, such as valves, are routinely cleansed to ensure that contaminants do not become trapped in such components and thereby introduced into the process system.

The cleansing processes may involve exposure to high temperature steam for a sufficient amount of time to sterilize the component. Particularly when repeated numerous times, this sterilization process can cause the plastic in the valve to change dimension slightly, resulting in warpage. Creeping results when plastic is subject to stress over a period of time. The plastic component's dimensions can change from the stress. Due to such warpage and creep, tolerances, especially at the weir, are affected and leakage may result.

Therefore, a need exists to provide a plastic lined weir-type diaphragm valve that has improved dimensional stability when exposed to repeated cleansing operations or exposure to conditions normally conducive to warpage or creep. Further, there is a continuing need to provide for a fully drainable valve suitable to branch control and sampling applications.

SUMMARY OF THE INVENTION

A fully draining valve apparatus in a preferred embodiment comprises an upper valve portion and a lower valve portion. The upper valve portion preferably includes an upper valve housing or body, a resilient diaphragm and a valve actuator. The lower valve portion comprises a lower valve housing or body that is preferably configured to mate with the upper valve housing to define a valve interior. The lower valve body preferably has an integral weir, which in conjunction with the resilient diaphragm, defines a fluid passage. The diaphragm is configured to sealingly engage and disengage with the weir as effected by the valve actuator. The weir defines an upper surface that is angled slightly with respect to the horizon to provide an interior passage slope. Said slope causes fluid to flow back into passage instead of remaining in the passage. Additionally, a slope is also formed on a lower portion of the flow passage defined by the valve body to cause fluid to drain into the third duct of the valve. The invention also includes the method of manufacturing a valve, preferably including the step of angling the horizontal surfaces within the fluid passages of the valve to promote full drainage of fluids that may otherwise accumulate.

A weir support member is disposable within the lower housing to support the weir. In preferred embodiments, an exoskeletal framework configured as the support collar extends circumferentially around the valve and supports the weir support member. In particular embodiments, the valve body components may also comprise a plastic fluoropolymer lining for contacting fluids. The invention also includes the method of manufacturing a reinforced plastic valve preferably including the step of providing a rigid support member to the weir of a lower valve housing.

An object and advantage of particular embodiments of the present invention is to provide for a fully drainable weir-type diaphragm valve.

An object and advantage of particular embodiments of the present invention is to provide a diaphragm valve wherein the weir is angled slightly above the horizontal to create a sloping surface.

An object and advantage of particular embodiments of the present invention is to provide a valve design that reduces the occurrence of retained fluids.

An object and advantage of particular embodiments of the present invention is to provide a valve design that reduces contamination of sterile or aseptic processes.

Another object, and advantage of particular embodiments of the present invention is to provide for a fluoropolymer diaphragm valve that is dimensionally tolerant to repeated sterilization processes.

Another object and advantage of particular embodiments of the present invention is to provide for a valve that is able to withstand repeated sterilization processes and that is also suitable to use in the pharmaceutical, biotechnological, chemical, and/or semiconductor industries.

Another object and advantage of particular embodiments of the present invention is to provide a means for reinforcing a plastic valve.

Another object and advantage of particular embodiments of the present invention is to provide for a method of reinforcing a plastic valve, thereby having improved resistance to warpage and creapage.

Another object and advantage of particular embodiments of the present invention is to provide a support for the weir of a plastic valve.

Further features, objects and advantages of the present invention will become apparent to those skilled in the art in the detailed description below.

DETAILED DESCRIPTION OF THE INVENTION

Figure 1:
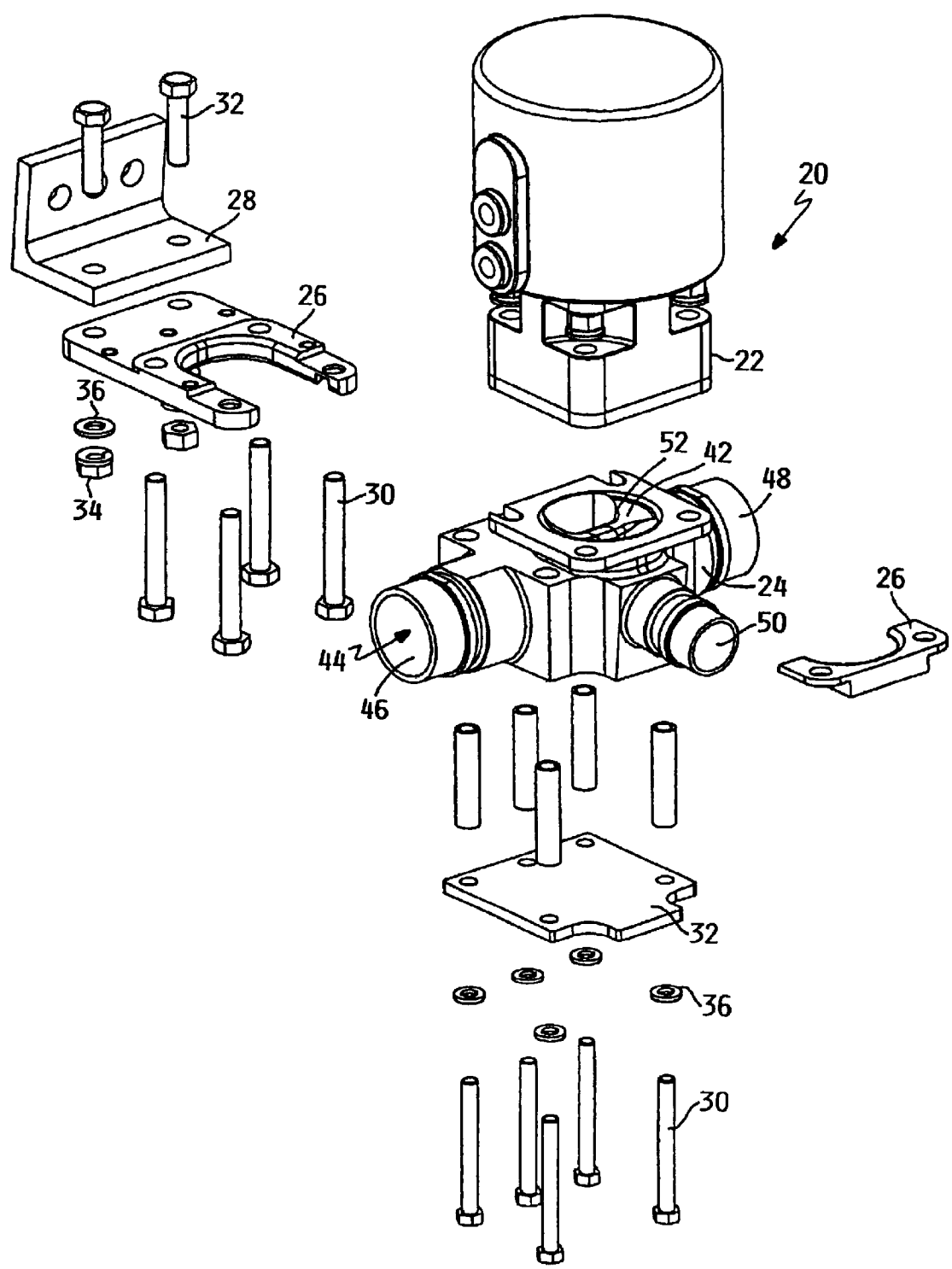
FIG. 1 is an exploded parts view of a diaphragm valve according to an embodiment of the present invention.
Figure 2:
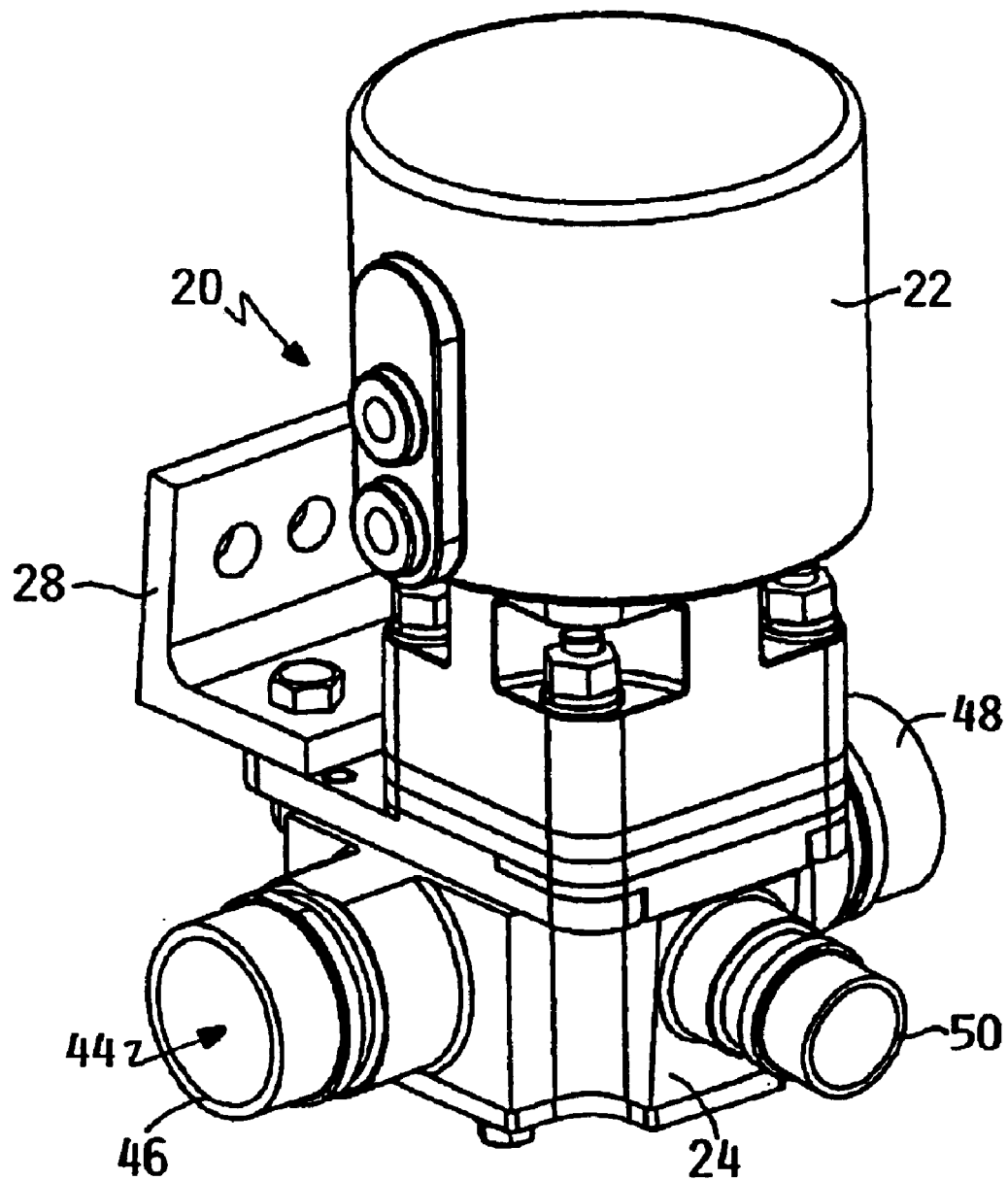
FIG. 2 is a perspective view of the assembled diaphragm valve of FIG. 1.
Figure 3:
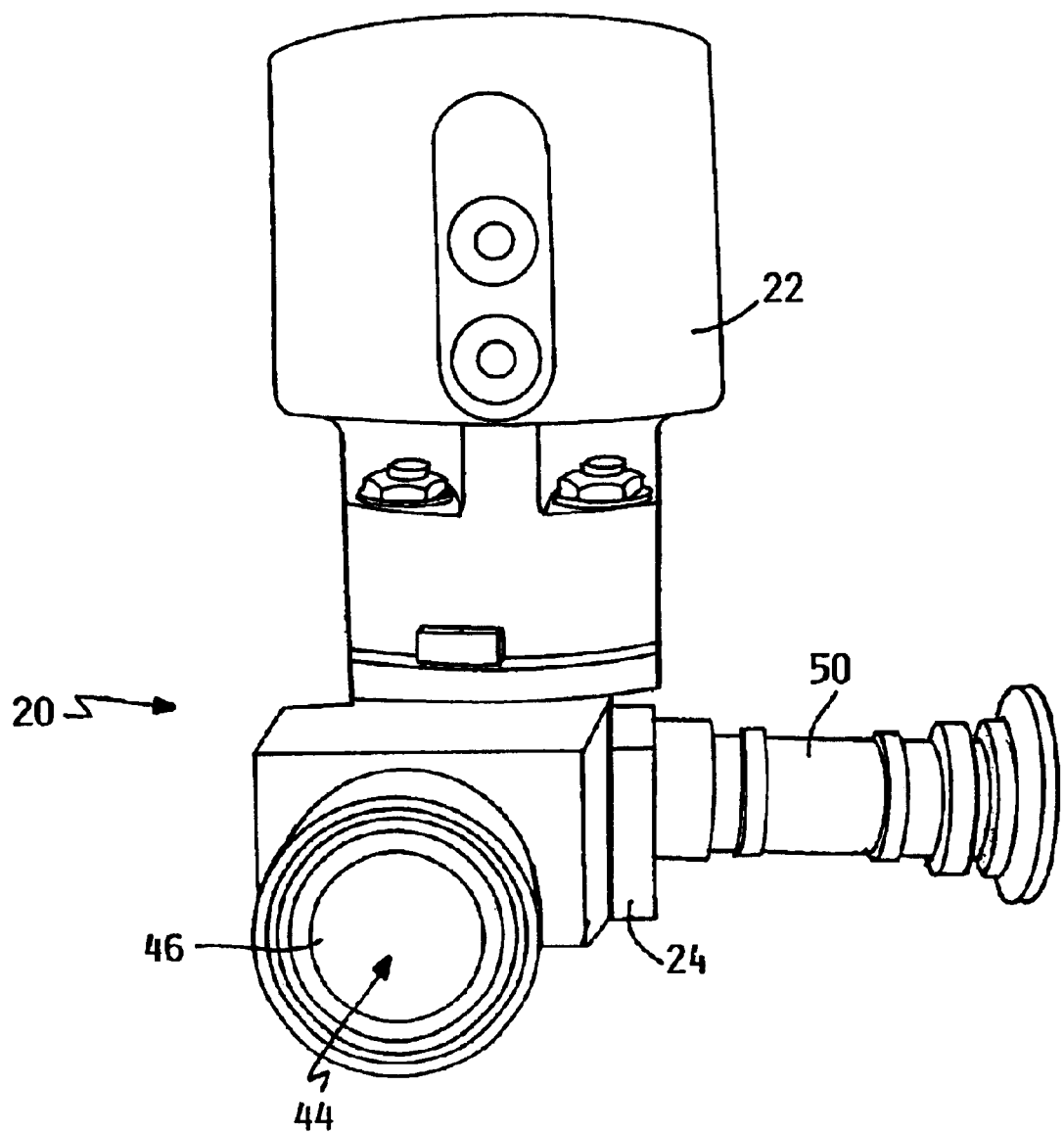
FIG. 3 is another perspective view of the assembled diaphragm valve of FIG. 1.

A weir-type diaphragm valve 20 in accordance with the invention is illustrated in FIGS. 1, 2 and 3. Such valve generally includes an upper valve portion 22, a lower valve portion 24, a bracket support framework 26 and a mounting bracket 28. A plurality of fasteners 30 are used to fasten the upper portion 12, lower portion 14 bracket 28 and bracket mount 26 as shown in the assembly drawing of FIG. 1. Additionally, an endoskeletal support member 32 may be used to add rigidity to the valve, which is often comprised of plastic. It should be understood that the terms upper valve portion 22 and lower valve portion 24 are used for convenience of description and that the valve of the present invention is not limited to the valve 20 being positioned such that the upper valve portion 22 must be vertically above lower valve portion 24 relative to the earth. In fact, a preferred operating position for the valve may include the upper valve portion 22 being positioned substantially to the side of the lower valve portion 24.

Figure 4:
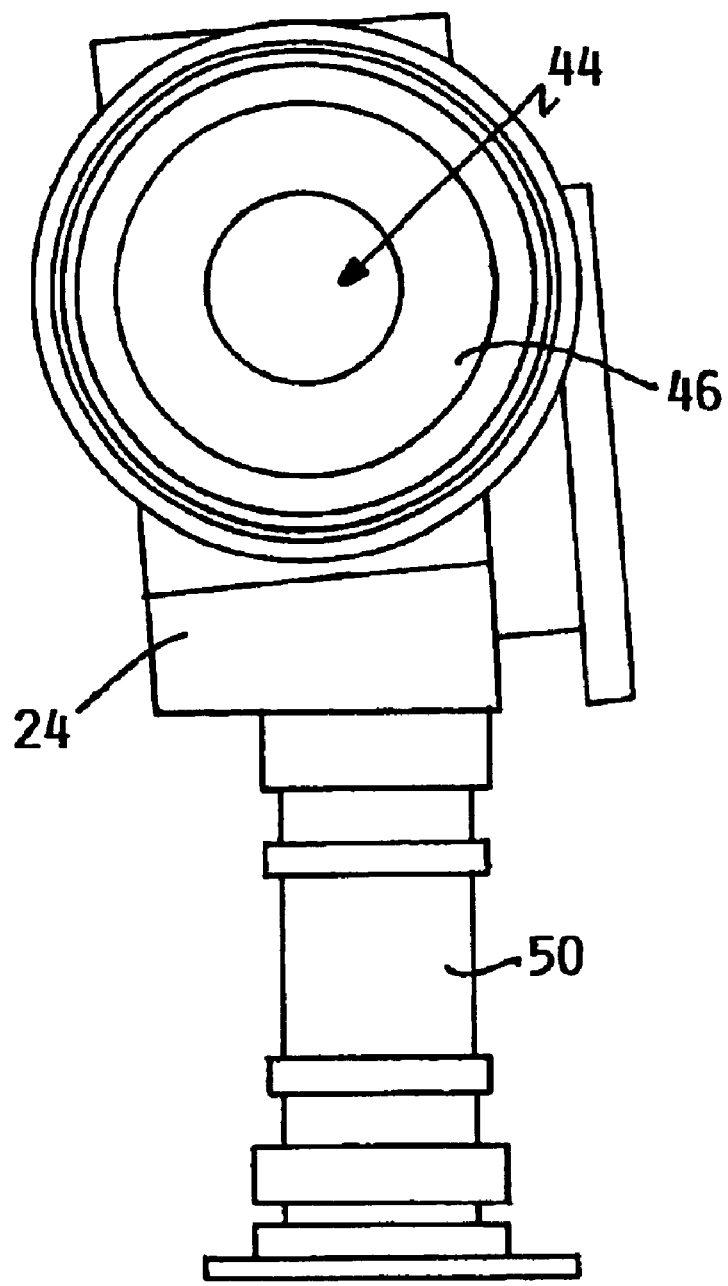
FIG. 4 is a side view of the lower portion of a diaphragm valve according to an embodiment of the present invention.

The upper portion 22 includes a resilient diaphragm 38 and an actuator for controllably sealing against the valve seat 42 provided in the lower housing 24. The lower housing 24, shown in FIGS. 1 and 4, comprises a central flow passage 44, a first flow duct 46, a second flow duct 48, a third flow duct 50 and a valve seat 42 therein. The valve seat 42 includes a weir 52 for isolating the third duct 50 from the first 46 and second 48 ducts when mated with the diaphragm 38.

Figure 5:
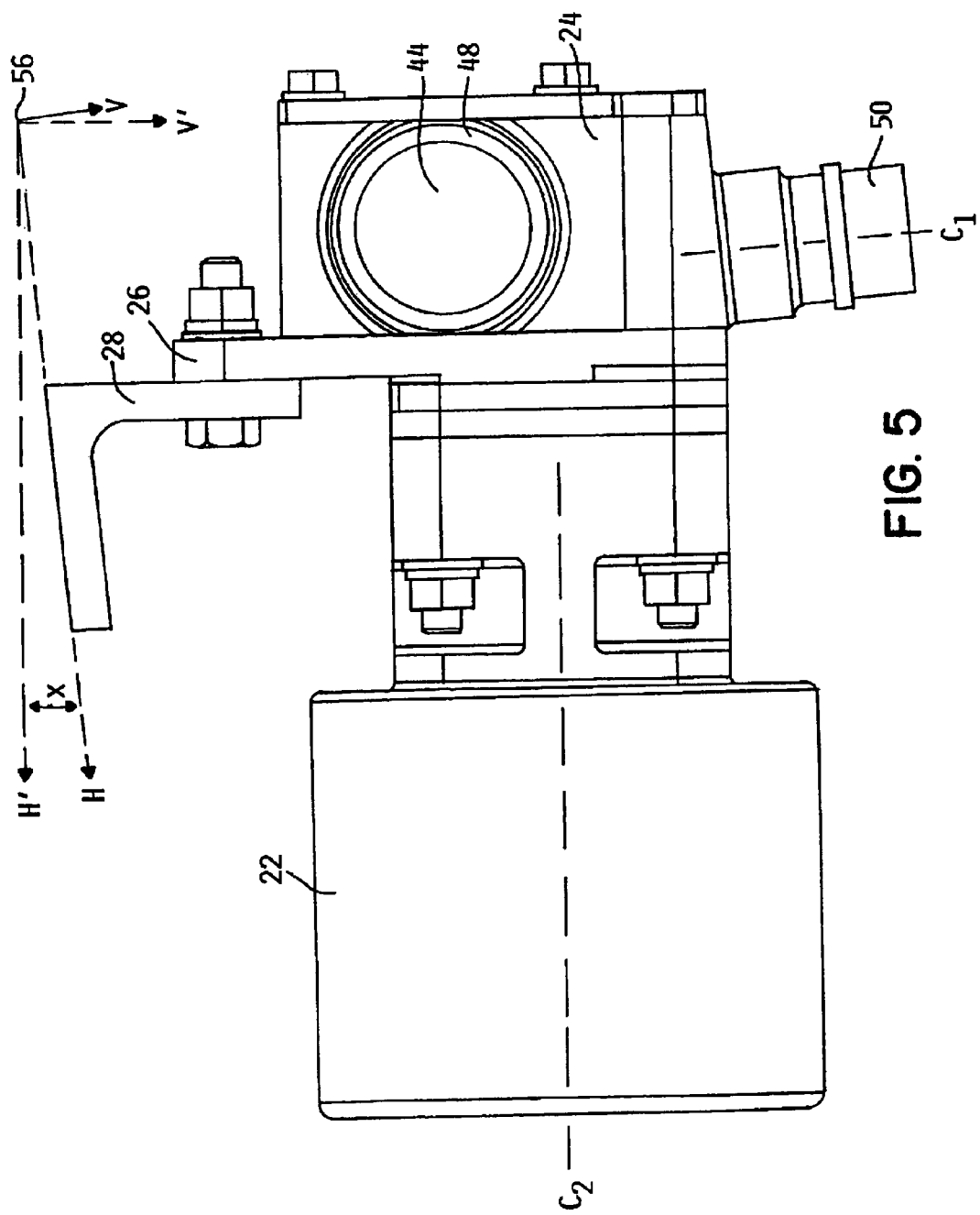
FIG. 5 is a side view of an assembled diaphragm valve according to an embodiment of the present invention.

Referring to FIG. 5, the valve 20 is shown assembled and in position for mounting to an overhead surface with the attached bracket 28. An axis 56 is shown to indicate the normal horizontal H and vertical V orientation of the valve 20. A centerline $C_1$ drawn through the third duct 50 is parallel to the vertical axis V. The horizontal axis H is normal to the vertical V. A centerline $C_2$ through the upper valve portion 22 is not parallel to the horizontal H; rather, it is parallel to the line indicated as H'. V' is defined as normal to H'. H' is tilted at angle X to the horizontal H. Angle X is preferably 5 degrees. However, those skilled in the art will recognize that X could include the following range $0° < x < 90°$ without departing from the spirit and scope of the present invention.

Figure 6:
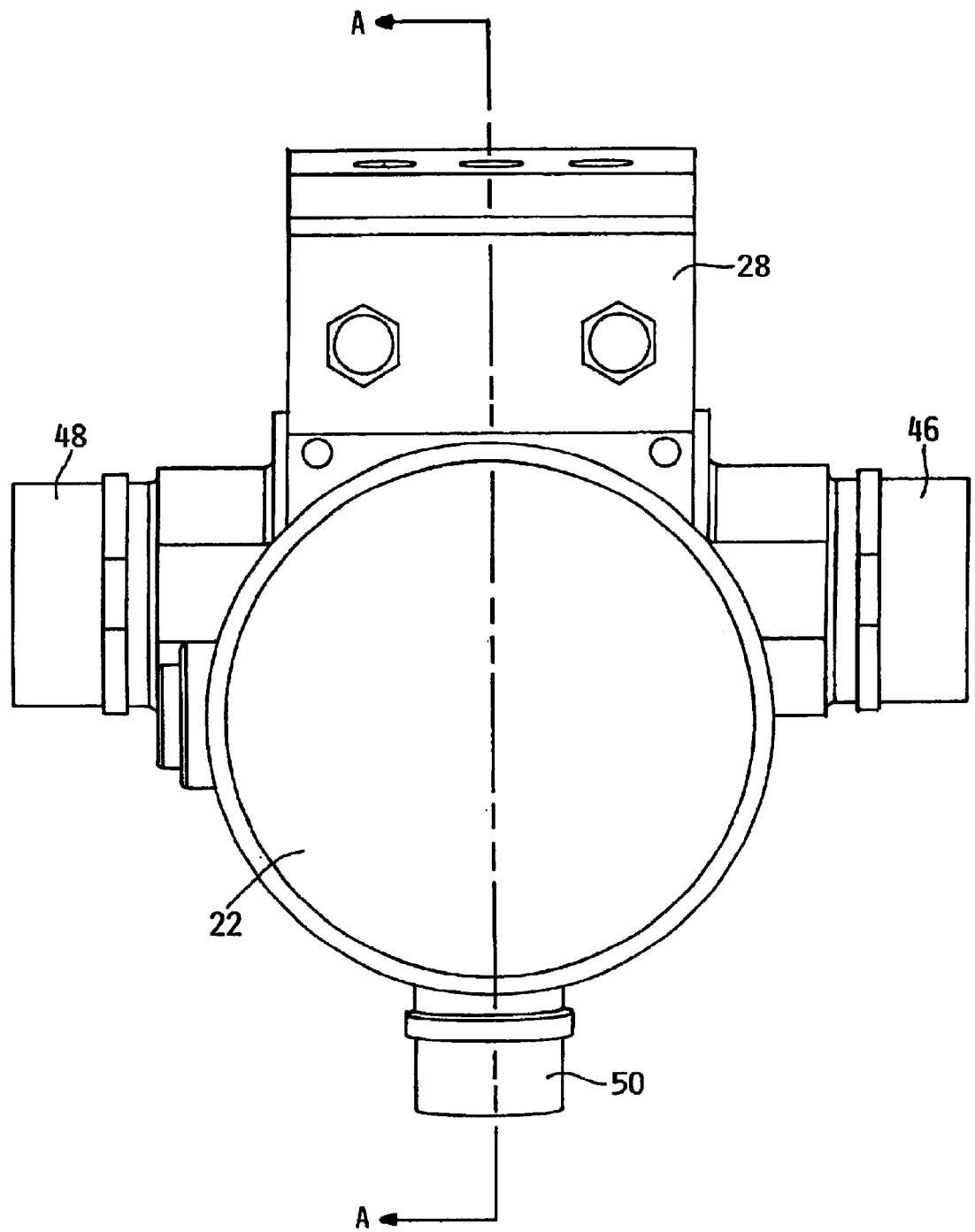
FIG. 6 is an end view of an assembled diaphragm valve according to an embodiment of the present invention.
Figure 7:
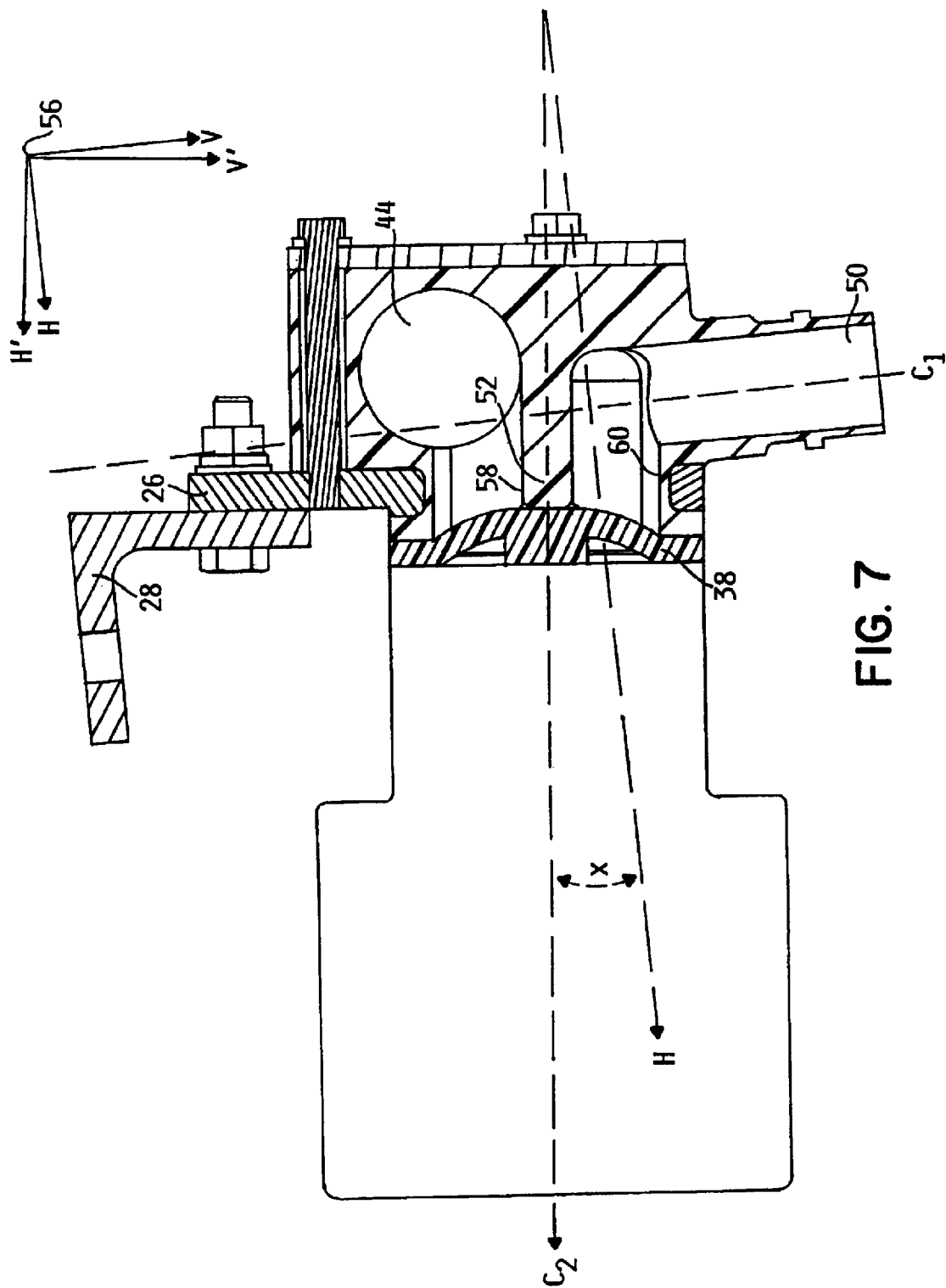
FIG. 7 is a partial cross sectional view of an assembled diaphragm valve according to an embodiment of the present invention taken along line A—A of FIG. 6.

FIG. 7 indicates a partial sectional view of valve 20 taken along line A—A of FIG. 6. The central passage 44 includes a first inwardly facing surface 58 defined by the weir 52. The centerline $C_2$ of the weir 52 (which, in some embodiments, may also be the same as centerline $C_2$ of the upper housing 22) is offset from the horizontal H by X degrees. This produces a slope on the first surface 58. The first sloped surface 58 ensures that all fluids drain into the central passage 44 between the first 46 and second 48 ducts.

A second inwardly facing surface 60 is provided to the inside of the passage 44 defined by the lower housing 24. This slope X may be the same as for the first surface 58, although it may be more of less depending on the application. Second sloped surface 60 causes fluids in the central passage 44 to drain into the third duct 50. The presence of these two sloped surfaces 58 and 60 allows all fluids to be fully drained from the valve 20, thereby addressing the retained fluid problems of the prior art.

Figure 8:
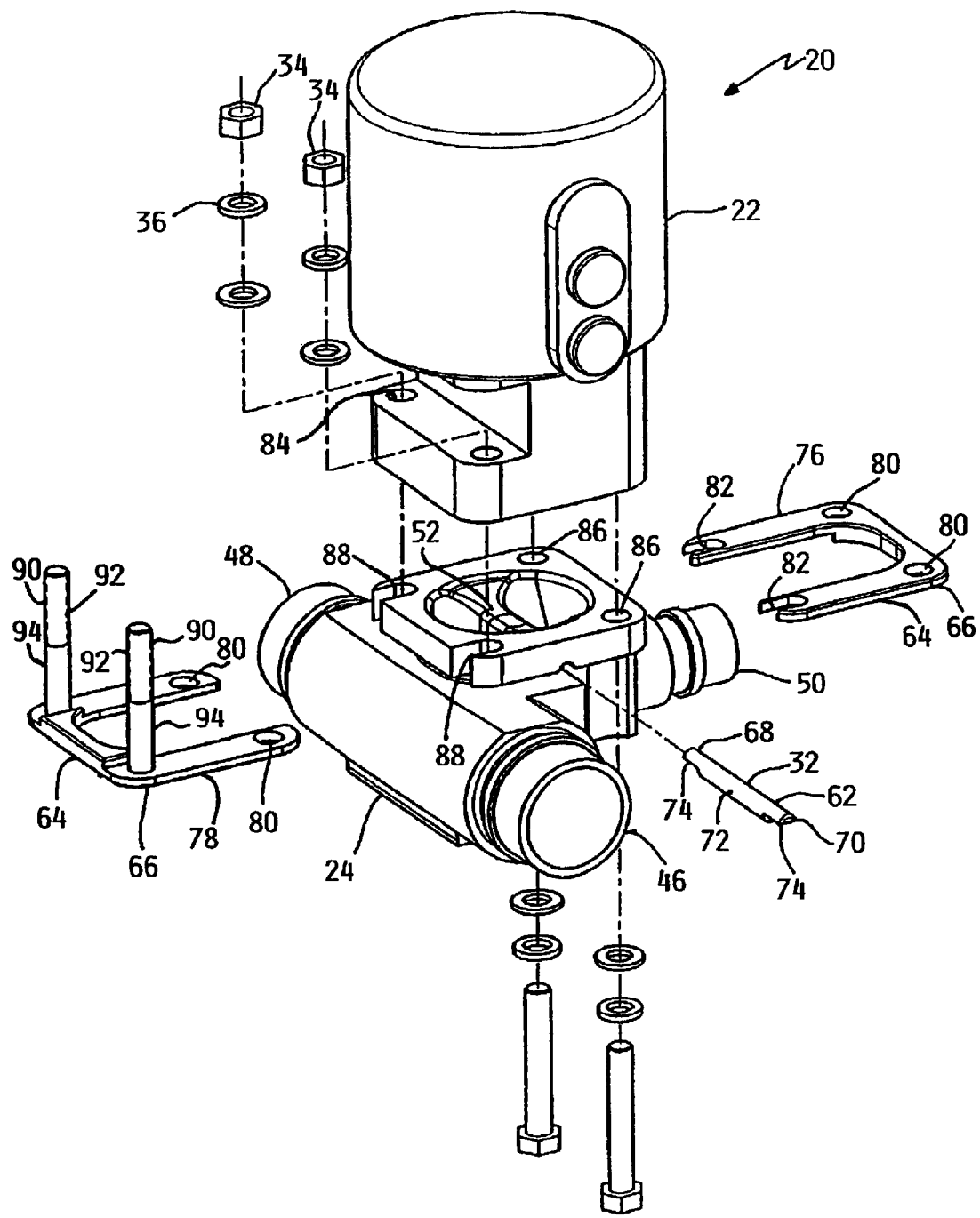
FIG. 8 is an exploded perspective view of a diaphragm valve according to an embodiment of the present invention.

The valve may be reinforced, or supported, by the provision of the endoskeletal support member 32 as depicted in FIG. 8. Endoskeletal support member 32 is configured as a weir support member 62 and exoskeletal framework 64 configured as support collar 66. The weir support member 62, as shown in FIG. 8, is preferably rod shaped having a first end 68, a second end 70, a longitudinal surface 72 and notches 74 in the longitudinal surface 72 at both first end 68 and second end 70. The weir support member 62 may be any suitably shaped elongated member. Those skilled in the art will recognize that many alternative embodiments of weir support member shape, such as polygonal, will provide the envisioned support without departing from the scope of the present invention.

The support collar 66, shown in FIG. 8 includes an upper bracket 76 and a lower bracket 78. The upper bracket 76 and lower bracket 78 are preferably approximately U-shaped and overlap when placed on the valve housing. There are a plurality of collar mounting holes 80 and slotted mount holes 82 in the upper bracket 76 that correspond to respective upper mounting holes 84, lower mounting holes 86 and mounting slots 88. The slotted mount holes 82 aide in joining the upper bracket 76 to the lower bracket 78 and the valve upper portion 22 and lower portion 24 during assembly.

The lower bracket 78 may be provided with two mounting posts 90 that cooperate with the mounting slots 88 and upper mounting holes 84 of the valve upper portion 22 and lower portion 24 and slotted mount holes 97 of the upper bracket 76 for enabling the joining of the valve upper portion 22 and lower portion 24. The mounting posts 90 have a threaded portion 92 and a smooth portion 94 to provide a means for fastening the valve upper portion 22 and lower portion 24 together. The lower bracket 78 also has two collar mounting holes 80 that communicate with respective collar mount holes 80 of the upper bracket 76, the upper mounting holes 84 of the valve upper portion 22 and the lower mounting holes 64 of the valve lower portion 24.

When assembled upper bracket 76 supports weir support member 62 at notches 74 thereby transferring force from weir 52 to weir support member 62 and thence to upper bracket 76 and lower bracket 78. This support prevents or reduces creep induced by pressure on weir 52 and other valve components. Thus, warpage and creep of the weir, the flanges and generally the valve body is inhibited.

The valve upper portion 22 and lower portion 24 are preferably formed of fluoropolymers, including but not limited to perfluoroalkoxy resin (PFA), polyvinylidene fluoride (PVDF) or other fluoropolymers. In certain applications, other plastics may be suitable, such as polyvinyl chloride (PVC), or polypropylene (PP). The body components are preferably injection molded, although they may be machined. The wetted portion of the diaphragm 38 may be formed of polytetrafluoroethylene (PTFE). The diaphragm may be composite with a layer adjacent the PTFE layer formed of EPDM. The weir support member 62 and the support collar 66 are preferably constructed of stainless steel. Stainless steel provides the desirable amount of rigidity and durability to provide the plastic valve with the desired amount of dimensional integrity. In certain instances, other rigid materials such as carbon fiber filled PEEK or other polymers may be utilized. Those skilled in the art will recognize that the above structures may be constructed from other materials without departing from the scope of the invention.

Although the present invention has been described with reference to preferred embodiments, workers skilled in the art will recognize changes may be made in form and detail without departing from the spirit and scope of the invention.

What is claimed is:

1. A plastic diaphragm valve comprising:
   a plastic upper valve body,
   a resilient diaphragm and an actuator in the upper valve body;
   a substantially plastic lower valve body configured to mate with the upper valve body, the lower valve body having an interior defining a fluid passage,
   the lower valve body comprising an integral weir, a first flow duct, a second flow duct and a third flow duct, the weir configured to sealingly interact with the diaphragm, the weir, the first flow duct, the second flow duct and the third flow duct each having an axis;
   the weir axis being sloped from a horizontal plane X degrees where 0<X<90, downwardly toward the first flow duct or the second flow duct;
   a portion of the fluid passage having an interior surface that is contiguous with and adjacent to the third flow duct; the portion being sloped downward toward the third flow duct;
   the third duct axis being oriented downwardly away from the weir and substantially parallel to a vertical axis such that substantially all liquid from within the fluid passage drains from the valve by gravity, and
   a weir support member extending longitudinally through the weir for reinforcing the weir.

2. The valve as claimed in claim 1, in which the first duct axis is sloped downwardly away from the weir and sloped from the horizontal plane Y degrees where 0<Y<90;
   the second duct axis being sloped downwardly away from the weir and sloped from the horizontal plane Z degrees where 0<Z<90; and the slopes X, Y and Z are each less than about thirty degrees.

3. The valve as claimed in claim 2, in which the slopes X, Y and Z are each less than about ten degrees.

4. The valve as claimed in claim 2, in which the slopes X, Y and Z are each about five degrees.

5. The valve as claimed in claim 1, in which the weir support member comprises two ends and the weir further comprising a support collar, the support collar engaged with the ends of the weir support member.

6. The valve as claimed in claim 5, the support collar comprising
   a first U-shaped portion; and
   a second U-shaped portion, the two portions overlapping and forming a closed loop and extending around the valve.

7. The valve as claimed in claim 1, in which the weir support is constructed of stainless steel.

8. A method for draining liquid from a plastic diaphragm valve, the valve comprising a plastic upper valve body, a resilient diaphragm and an actuator in the upper valve body; a substantially plastic lower valve body configured to mate with the upper valve body, the lower valve body having an interior defining a fluid passage, the lower valve body comprising an integral weir, a first flow duct, a second flow duct and a third flow duct, the weir configured to sealingly interact with the diaphragm, the weir, the first flow duct, the second flow duct and the third flow duct each having an axis; the method comprising:

sloping the weir axis from a horizontal plane X degrees where 0<X<90, downwardly toward the first flow duct or the second flow duct;

sloping a portion of the fluid passage having an interior surface that is contiguous with and adjacent to the third flow duct downward toward the third flow duct;

orienting the third duct axis downwardly away from the weir and substantially parallel to a vertical axis such that substantially all liquid from within the fluid passage drains from the valve by gravity; and reinforcing the weir with a weir support member.

9. The method of claim 8, further comprising the steps of sloping the first duct axis downwardly away from the weir and from the horizontal plane Y degrees where 0<Y<90;

sloping the second duct axis downwardly away from the weir and from the horizontal plane Z degrees where 0<Z<90; and limiting the values of X, Y and Z each to less than thirty degrees.

10. The method of claim 9, further comprising the step of limiting the values of X, Y and Z each to less than ten degrees.

11. The method of claim 9, further comprising the step of limiting the values of X, Y and Z each to about five degrees.

12. The method of claim 8, further comprising the step of supporting two ends of the weir support member with a support collar.

13. The method of claim 12, further comprising the step of assembling the support collar from a first U-shaped portion and a second U-shaped portion and overlapping the first and second U-shaped portions to form a closed loop around the valve.

14. The method of claim 8, further comprising the step of forming weir support member from stainless steel.

15. A plastic diaphragm valve comprising:

a plastic upper valve body, a resilient diaphragm and an actuator in the upper valve body;

a substantially plastic lower valve body configured to mate with the upper valve body, the lower valve body having an interior defining a fluid passage, the lower valve body comprising an integral weir, a first flow duct, a second flow duct and a third flow duct, the weir configured to sealingly interact with the diaphragm, the weir, the first flow duct, the second flow duct and the third flow duct each having an axis;

the weir axis being sloped, from a horizontal plane toward the first or the second flow duct;

the third duct axis being oriented downwardly away from the weir and substantially parallel to a vertical axis such that substantially all liquid from within the fluid passage drains from the valve by gravity; and a weir support member extending longitudinally through the weir for reinforcing the weir.

16. The valve as claimed in claim 15, in which the weir support member comprises two ends and the weir further comprising a support collar, the support collar engaged with the ends of the weir support member.

17. The valve as claimed in claim 16, the support collar comprising a first U-shaped portion; and a second U-shaped portion, the two portions overlapping and forming a closed loop and extending around the valve.

18. The valve as claimed in claim 15, in which the weir support is constructed of stainless steel.

19. The valve as claimed in claim 15, in which, the first flow duct, the second flow duct and the third flow duct each slope downwardly away from the weir at an angle less than about thirty degrees from a horizontal plane.

20. The valve as claimed in claim 15, in which, the first flow duct, the second flow duct and the third flow duct each slope downwardly away from the weir at an angle less than about ten degrees from a horizontal plane.

21. The valve as claimed in claim 15, in which, the first flow duct, the second flow duct and the third flow duct each slope downwardly away from the weir at an angle of about thirty degrees from a horizontal plane.

22. The valve as claimed in claim 15, in which the first duct axis is sloped downwardly away from the weir.

23. The valve as claimed in claim 22, in which the second duct axis is sloped downwardly away from the weir.

* * * * *